Patented Jan. 26, 1954

2,667,416

UNITED STATES PATENT OFFICE 2,667,416

STABILIZATION OF FISH PRESS LIQUOR

Earl P. McFee, Gloucester, Mass., assignor to Monsanto Chemical Company, a corporation of Delaware No Drawing. Application April 4, 1951,
Serial No. 219,309

9 Claims. (Cl. 99—7)

1

The present invention relates to fish press water and condensed fish solubles of improved stability and to a method of producing same.

An object of the invention is to provide fish press water of substantially increased stability to decomposition in storage.

Another object of the invention is to provide condensed fish solubles of substantially increased stability to decomposition in storage, in the feed plant, and in packaged feeds.

Another object of the invention is to provide condensed fish solubles of improved stability to change in odor, when stored alone or when admixed with feeds.

An additional object of the invention is to provide fish press water and condensed fish solubles having a substantially reduced tendency to form sediment and encrustations in storage tanks, and to clog pumps, valves and spray nozzles, thereby greatly facilitating the handling of these materials.

A further object of the invention is to provide fish press water and condensed fish solubles of greatly reduced tendency to lose their nutritive value through decomposition.

A still further object is to provide a method of producing fish press water and condensed fish solubles having the above-mentioned properties.

Other objects and advantages of the invention will become apparent to those skilled in the art as the description unfolds.

In the production of fish meal, whole fish and/or fish waste from filleting operations, etc. are cooked with live steam in a continuous cooker and then conveyed to a continuous screw press where the excess water and oil are removed as completely as possible, leaving press cake which is dried and ground to produce fish meal. The press water or uncondensed fish solubles are then freed of their oil content and evaporated to the desired concentration which usually corresponds to a product containing about 50% solids. The concentrated product thus obtained is known in the art as condensed fish solubles.

Fish press water is quite unstable and unless held at elevated temperatures, it decomposes in a relatively short period of time. Consequently it is not unusual for the foregoing product to spoil in a period of 24 hours or less when stored at room temperature. Since, for one reason or

2 another, it is frequently necessary to store press water prior to evaporation for an equivalent or a longer period of time, it is highly essential to stabilize same against decomposition during the interval between its production and condensation. Therefore, it has been the practice to achieve this objective by lowering the acidity of the press water to a pH of about 4.5 by adding sulfuric acid. While this procedure effects the desired degree of stabilization, it is subject to a number of serious disadvantages which render it commercially unattractive.

For example, the acidification of press water by means of sulfuric acid results in corrosion of the equipment, particularly the evaporator tubes, and also causes precipitation of mineral salts and soluble proteins. Moreover, if not removed, the resulting precipitate tends to plug the tubes and form hard cakes in the storage tanks; in addition, the precipitate formed on evaporation of the acidified product presents a similar problem and tends to clog pumps, valves and spray nozzles. Therefore, it is obvious that the foregoing procedure is unsatisfactory from the standpoint of handling and cost.

One of the difficulties in marketing condensed fish solubles has been in the wide variation in the quality of the product. This difficulty, in part at least, stems from the instability of press water which results in the destruction of some of the amino acids and growth factors that make solubles important to feed blenders. Moreover, this instability is manifested in the condensed product with the result that the above destructive process is continued and, if allowed to proceed, a product of greatly reduced commercial value is obtained.

For example, if decomposition is not prevented or substantially inhibited, the condensd fish solubles not only have a dsagreeable odor which is carried over into the bagged feed but there is also a tendency for the feed to mold and the eggs of chickens feeding thereon to have a fishy taste. Besides, decomposition of condensed solubles has the undesirable effect of substantially decreasing the nutritive value of the above product. Thus, according to Poultry Science, vol. XXVII, No. 1, (Jan. 1949), pages 134-140, the loss in amino acids of condensed solubles, after 96 hours' decomposition, was so great that glycine and thiamin disappeared completely; cystine lost 38% of its content, methionine 80%, histidine 98% and valine 99%. Furthermore, chickens fed with feeds containing decomposed solubles averaged only 145 grams in 6 weeks, while those eating feed with undecomposed solubles averaged 242 grams in the same period.

In view of the foregoing, it is evident that the stability of fish press water (uncondensed solubles) and condensed solubles is extremely important to the feed producer and the fish plant operator because if the product presents a difficult and costly handling problem and has an unpleasant odor and is low in nutritional value, it is of little commercial interest to either industry.

I have made the surprising discovery that fish press water and condensed fish solubles can be stabilized against substantial decomposition by adding thereto a relatively small amount of an acid to neutral reacting compound selected from the group consisting of alkali and alkaline earth metal phosphates. By acid to neutral reacting compounds, I mean those phosphates in the above groups which give a pH of about 7 or less in 1% solution. As typical examples of compounds within the above definition there may be mentioned hemi-sodium phosphate $(NaH_2PO_4.H_3PO_4)$ mono-sodium orthophosphate, sodium acid pyrophosphate, sodium trimetaphosphate, sodium hexametaphosphate, monocalcium phosphate, calcium hemibasic phosphate $[Ca(H_5(PO_4)_2)_2]$ and calcium acid pyrophosphate.

In carrying out the instant invention, the above stabilizers are dissolved in fish press water in an amount corresponding to about 0.05% to about 1% by weight and in condensed fish solubles in an amount corresponding to about 0.5% to 10%. Larger or smaller quantities may be added as desired, but it is preferred to use about .25% to 0.5% by weight in the fish press water and then concentrate the product to a point yielding a stabilizer concentration of from 2.5% to 5.0% by weight.

For a more complete understanding of the present invention reference is made to the following illustrative examples.

*Example I*

200 grams of oil-free press water was placed in a series of covered glass jars and then treated at room temperature (25° C.) with the following indicated quantities of sodium phosphates:

| Treatment | pH | Time to Spoil As Evidenced by Odor |
|---|---|---|
| (1) Untreated oil-free press water | 6.52 | 24 hours. |
| (2) Oil-free press water plus 0.5% by weight of sodium hexametaphosphate. | 6.62 | 48 hours. |
| (3) Oil-free press water plus 0.25% by weight of sodium acid pyrophosphate. | 5.98 | 72 hours. |
| (4) Oil-free press water plus 0.5% by weight of sodium acid pyrophosphate. | 5.8 | Not spoiled after 96 hours. |

The above data clearly demonstrate that the above compounds are highly effective in retarding the decomposition of press water; they also show that sodium acid pyrophosphate is markedly superior to sodium methaphosphate in its stabilizing action.

*Example II*

Press liquor was similarly treated with 0.5% by weight of monocalcium phosphate, sodium hexamethaphosphate, monosodium orthophosphate and sodium acid pyrophosphate respectively and then held at room temperature. The following observations were then made on spoilage rates:

| Treatment | Time To Spoil As Evidenced By Odor | |
|---|---|---|
| | *Hours* | |
| (1) Untreated oil-free press water | 41 | Badly spoiled. |
| (2) Oil-free press water plus 0.5% by weight of calcium pyrophosphate. | 41 | Do. |
| (3) Oil-free press water plus 0.5% by weight of monocalcium phosphate. | 68 | Spoiled. |
| (4) Oil-free press water plus 0.5% by weight of sodium hexametaphosphate. | 68 | Do. |
| (5) Oil-free press water plus 0.5% by weight of monosodium orthophosphate. | 68 | Do. |
| (6) Oil-free press water plus 0.5% by weight of sodium acid pyrophosphate. | 92 | Spoilage barely started. |

The above data indicate that all of the above compounds except calcium pyrophosphate are effective stabilizers; that the sodium phosphates are more effective than calcium phosphates; and that sodium acid pyrophosphate is the most effective of all the stabilizers tested.

The stabilized press water (uncondensed fish solubles) obtained in the manner described in the above examples is then converted into stable condensed solubles by evaporation, preferably under reduced pressure, until the concentration of the stabilizer has been increased ten times its original value in the uncondensed solubles. As an alternative method, the press water may be promptly evaporated to yield finished solubles which are then stabilized by adding the previously indicated quantity of phosphate salt.

In addition to adding the above phosphates to fish press water or condensed fish solubles, they may be incorporated in these products by dusting whole or waste fish that are destined for the production of fish meal and condensed solubles.

By proceeding in the above manner, I have produced condensed fish solubles which remained in good condition for more than a year. This is an exceedingly important contribution to the art since it is sometimes necessary for producers or feed blenders to store condensed fish solubles for 6 to 8 months due to fluctuation in fish catches.

As pointed out earlier in the specification, the stabilizers within the scope of the instant invention are water soluble acid to neutral reacting alkali and alkaline earth metal phosphates. Of these compounds, the molecularly dehydrated sodium phosphates having a sodium oxide to phosphorus pentoxide molecular ratio within the range of about 0.5:1 to about 1:1 are preferred since they provide optimum conditions for vitamin stability. Moreover, these sodium phosphates have the further advantage of not corroding the evaporator tubes and because of their sequestering and/or peptizing action tend to hold the mineral salts in solution and prevent or substantially inhibit separation of the above materials in storage tanks. Furthermore, comparative tests show that condensed solubles containing the above sodium phosphates are more stable to decomposition than solubles treated with sulfuric acid. Finally, chick feeding tests made with sodium phosphates within the above range show that condensed solubles stabilized therewith are in every way satisfactory for chick nutrition and that the above compounds are not at all harmful to the growth factors.

Fish press liquor within the meaning of the instant specification and claims is a generic expression covering fish press water and condensed fish solubles.

In the practice of the above invention, various modifications may be made in the procedure and in the reagents used without departing from the spirit of the invention. Thus, the above phosphates may be used separately or mixtures thereof providing a pH not substantially exceeding 7 may be employed with similar effects.

What I claim is:

1. Fish press liquor stabilized against substantial decomposition by means of a relatively small amount of sodium acid pyrophosphate.

2. Fish press liquor stabilized against substantial decomposition by means of about 0.05% to about 10% by weight of sodium acid pyrophosphate.

3. Fish press liquor stabilized against substantial decomposition by means of about 0.25% to about 5.0% by weight of sodium acid pyrophosphate.

4. Uncondensed fish soluble stabilized against substantial decomposition by means of about 0.05% to about 1% by weight of sodium acid pyrophosphate.

5. Condensed fish solubles stabilized against substantial decomposition by means of about 0.5% to about 10% by weight of sodium acid pyrophosphate.

6. The method of stabilizing fish press liquor against substantial decomposition, which comprises adding thereto in stabilizing amounts sodium acid pyrophosphate.

7. The method of stabilizing fish press liquor against substantial decomposition, which comprises adding thereto about 0.05% to about 10% by weight of sodium acid pyrophosphate.

8. The method of stabilizing fish press liquor against substantial decomposition, which comprises adding thereto about 0.25% to about 5.0% by weight of sodium acid pyrophosphate.

9. The method of stabilizing uncondensed fish solubles against substantial decomposition, which comprises adding thereto about 0.05% to about 1% by weight of sodium acid pyrophosphate.

EARL P. McFEE.

References Cited in the file of this patent

UNITED STATES PATENTS

| Number | Name | Date |
|---|---|---|
| 2,371,812 | Ernst | Mar. 20, 1945 |
| 2,403,174 | Ernst | July 2, 1946 |
| 2,513,094 | Hall | June 27, 1950 |
| 2,566,549 | Beckwith et al. | Sept. 4, 1951 |
| 2,629,664 | Watts et al. | Feb. 24, 1953 |